United States Patent [19]

Ebi et al.

[11] 4,381,513

[45] Apr. 26, 1983

[54] DEFLECTION PLATES FOR ELECTROSTATIC INK-JET PRINTER

[75] Inventors: Yutaka Ebi, Kawasaki; Yutaka Kodama, Tokyo, both of Japan

[73] Assignee: Ricoh Co., Ltd., Tokyo, Japan

[21] Appl. No.: 147,278

[22] Filed: May 6, 1980

[30] Foreign Application Priority Data

May 10, 1979 [JP] Japan .................................. 54/56351

[51] Int. Cl.3 .............................................. G01D 15/18

[52] U.S. Cl. ................................................. 346/75

[58] Field of Search .......................................... 346/75

[56] References Cited

U.S. PATENT DOCUMENTS

| | | | |
|---|---|---|---|
| 3,373,437 | 3/1968 | Sweet | 346/75 |
| 3,769,631 | 10/1973 | Hill | 346/75 |
| 3,786,517 | 1/1974 | Krause | 346/75 |
| 3,955,203 | 5/1976 | Chocholaty | 346/75 |
| 4,010,477 | 3/1977 | Frey | 346/75 |
| 4,023,183 | 5/1977 | Takano | 346/75 |
| 4,068,241 | 1/1978 | Yamada | 346/75 |
| 4,097,872 | 6/1978 | Giordano | 346/75 |

OTHER PUBLICATIONS

Thompson et al.; Ink Drop Deflection Plates; IBM TDB, vol. 17, No. 5, Oct. 1974, p. 1318.

*Primary Examiner*—Joseph W. Hartary

*Attorney, Agent, or Firm*—Burgess, Ryan and Wayne

[57] ABSTRACT

Deflection plates for electrostatic ink-jet printers in which the leaving and entering ends of the deflection plates are tapered or curved outwardly away from each other or formed with notches in parallel with the flight path of ink drops.

8 Claims, 19 Drawing Figures

DEFLECTION PLATES FOR ELECTROSTATIC INK-JET PRINTER

BACKGROUND OF THE INVENTION

The present invention relates to deflection plates for an electrostatic ink-jet printer.

In order to print the ink-dot images at a high speed and with a higher degree of resolution, multi-nozzle ink-jet print heads with a large number of nozzles with very fine diameters have been increasingly developed. However, obviously a nozzle of an extremely fine diameter produces an ink drop of a corresponding size so that its kinetic energy is low and consequently it is easily susceptible to aerodynamic and electrostatic disturbance while it is in flight. To the same ends, there has been a tendency toward the arrangement in which the trajectory of the ink drops is selected closer to the deflection plates. However, when the trajectory is made too close to the deflection plates so that the boundary layers of the air streams produced by the flight of ink drops reaches the surfaces of the deflection plates, turbulent flows are produced, so that the ink drops are deflected from the intended trajectory and consequently the misplacement of ink drops results which causes misregistration, merging and scattering of ink drops on a recording paper, degrading the quality of printed images.

When a pair of the deflection plates are disposed in parallel with each other, the electrostatic lines are concentrated at the entering and leaving ends, so that the gradient of the electric field becomes greater and consequently the ink drops are deflected at an angle greater than the desired deflection angle, so that the misplacement of ink drops also results.

SUMMARY OF THE INVENTION

One of the objects of the present invention is to provide deflection plates for an electrostatic ink-jet printer which can prevent the impingement or striking of the air streams produced by the flight of a stream of ink drops against the surfaces of the deflection plate can be completely avoided, whereby images with high qualities can be obtained.

Another object of the present invention is to provide deflection plates for an electrostatic ink-jet printer in which the undesired excessive concentrations of the electrostatic lines at the entering and leaving ends of the deflection plates which concentrations cause excessive deflections of charged ink drops can be avoided by outwardly tapering or curving the entering and leaving ends, thereby the distortions of the printed images due to the misplacement of ink drops can be avoided.

A further object of the present invention is to provide deflection plates for an electrostatic ink-jet printers in which the impingement or striking of uncharged ink drops against the deflection plate can be avoided so that the distance between an ink drop generator or a nozzle thereof and a recording medium can be minimized and consequently the adverse effects on the flight of ink drops due to the aerodynamic disturbances can be eliminated.

To the above and other ends, briefly stated, the present invention provides deflection plates whose entering and leaving ends are gradually tapered or curved outwardly away from each other. Alternatively, in the case of a multi-nozzle ink-jet print head, a positively charged deflection plate of one deflection plate pair and a negatively charged deflection plate of the adjacent deflection plate pair are mounted on a common insulating mount and the entering and leaving ends of the insulating mount are smoothly tapered or curved outwardly in such a way that the tapered or curved surfaces smoothly meet the flat surfaces of the deflection plates. In addition, the present invention provides deflection plates for an electrostatic ink-jet printer whose entering and leaving ends are formed with notches in parallel with the trajectory of ink drops.

The above and other objects, effects and features of the present invention wll become more apparent from the following description of some preferred embodiments thereof taken in conjunction with the accompanying drawings.

DETAILED DESCRIPTION OF THE PREFERRED EMBODIMENTS

Figure 1:
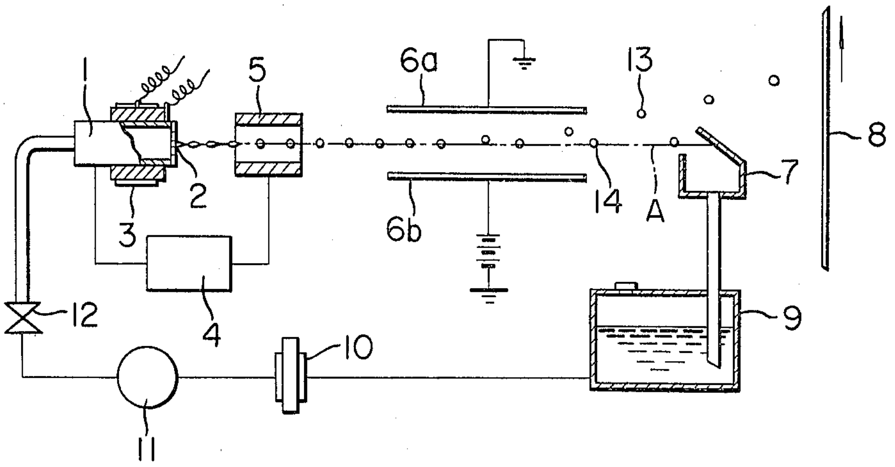
FIG. 1 PRIOR ART
FIG. 1 is a diagrammatic view of an electrostatic ink jet printer to which is applied the present invention.
Figure 2:
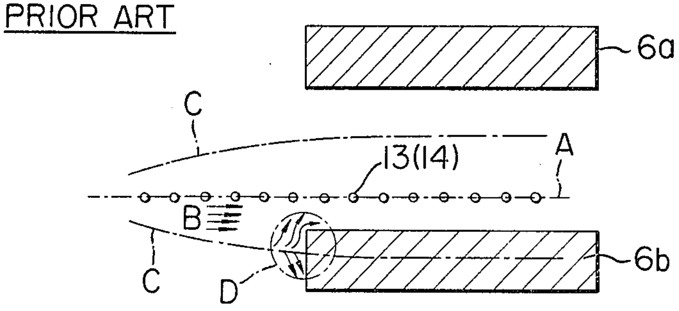
FIG. 2 PRIOR ART
FIG. 2 is a view used to explain how the turbulent flows are produced due to the flight of a stream of ink drops at the leading or entering end of a deflection plate.

In FIG. 1 is shown a block diagram of an electrostatic ink-jet printer to which is applied the present invention. An ink drop generator 1 has an orifice or a nozzle 2 and a piezoelectric crystal or the like 3 and is electrically connected to a character forming circuit or an analogue modulated charge voltage generator 4 which is also connected to a charge electrode 5. After leaving the charge electrode 5, the ink drops pass between deflection plates *6a* and *6b* that bear a steady high voltage and the undeflected ink drops 14 are trapped by a gutter 7 while the deflected ink drops 13 are directed to predetermined positions on a recording sheet 8. The trapped ink droplets are collected in a reservoir 9 and recirculated through a filter 10, a pump 11 and a flow rate control valve 12 into the ink manifold of the ink-drop generator 1.

As is well known to those skilled in the art, the piezoelectric crystal or the like 3 oscillates in response to the external signal so that the ink is forced through the nozzle 2 into a jet of ink which in turn is broken up into a stream of ink drops. When a drop breaks off, a charge proportional to the voltage on the charge electrode 5 is trapped on the ink drops in response to the modulated charge voltage supplied from the character forming circuit 4. The charged ink drops pass between the deflection plates *6a* and *6b* and are deflected by an amount proportional to their charge. In this way, an ink drop can be directed to any position on the recording sheet 8 so that the alphanumerics, symbols, or the like are printed on the recording sheet 8.

Figure 3:
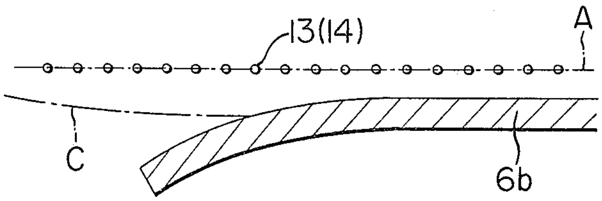
FIGS. 3 through 5 are views used to explain the construction of the deflection plates in accordance with the present invention.
Figure 4:
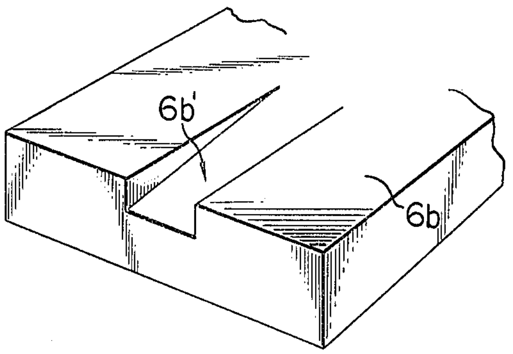
Figure 5:
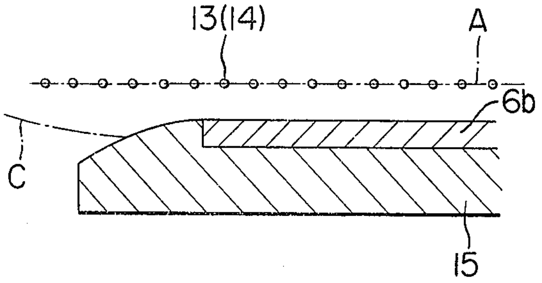

In order to solve the above-described problems caused by the aerodynamic disturbances while the ink drops are in flight, the present invention provides various countermeasures. For instance, the entering end portion of the deflection plate *6b* gradually diverges outwardly as shown in FIG. 3. Alternatively, a slanting slot *6b'* is formed in the deflection electrode 6 adjacent to the entering end thereof and in parallel with the flight path of the ink drops as shown in FIG. 4. In addition, there has been proposed a countermeasure in which, as shown in FIG. 5, the deflection electrode or plate *6b* is embedded in an insulating member 15 whose entering end portion is tapered so that the turbulent flows may not be produced at the entering end of the deflection plate *6b*.

Since the distance between the ink drop generator 1 and the charge electrode 5 is very short, no boundary layers have been formed so that the aerodynamic disturbance on the ink drops while they are in flight from the ink drop generator 1 to the charge electrode 5 can be avoided. As to the aerodynamic disturbance on the uncharged ink drops which are directed toward the gutter 7, it presents no problem at all because the undeflected ink drops are not needed to be directed to correct positions.

Figure 6:
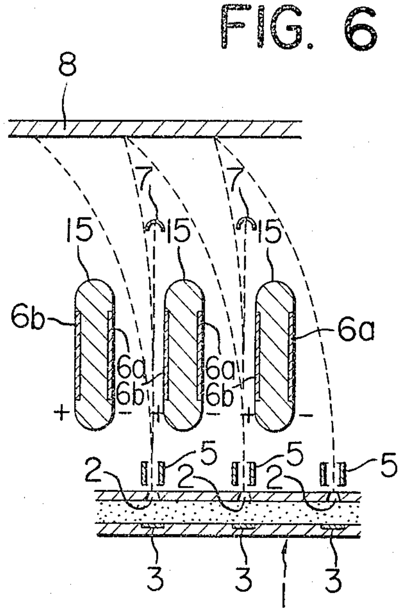
FIG. 6 is a fragmentary sectional view of a multi-nozzle ink-jet print head to which is applied the present invention.

In FIG. 6 is shown in a fragmentary view, a multi-nozzle print head in which each of the deflection plate pairs *6a* and *6b* are embedded in the insulating member 15 whose entering ends are gradually tapered.

As is clear from the above description, the flight path of the ink drops can be made closer to the deflection plates *6a* and *6b* without causing the aerodynamic disturbance so that the printing at a high speed and with a higher degree of ink dot density can be accomplished. In addition, the stable printed images can be obtained.

Figure 7:
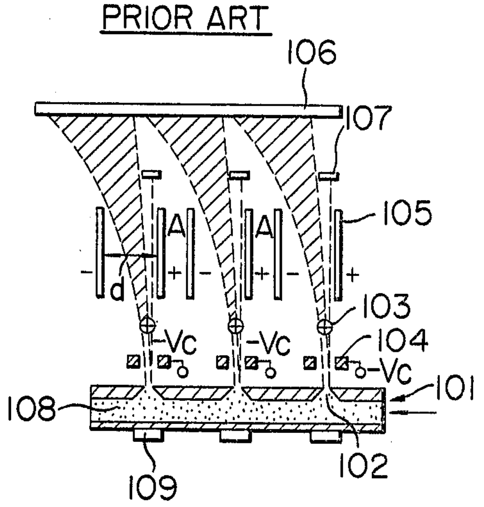
FIG. 7 PRIOR ART
FIG. 7 is a fragmentary sectional view of a prior art multi-nozzle ink-jet print head.

In FIG. 7 is shown in fragmentary view, a prior art multi-nozzle ink-jet print head. A plurality of nozzles 102, which are arranged in a row or column, share a single ink manifold 108 in the print head 101 with piezoelectric crystals or the like 109 mounted thereon in opposed relationship with the corresponding nozzles 102. The ink drops 103 which are emerging continuously and simultaneously through the nozzles 102, pass through their respective charge electrodes 104 so that they can be selected individually for printing or for deflection in response to the modulated voltage signals applied to the charge electrodes 5. Each stream of ink drops is provided with a separate pair of deflection electrodes 105 so that the charged ink drops 103 can be deflected and directed to predetermined positions on the recording sheet 106, whereby the desired characters, numbers and symbols can be printed. The uncharged ink drops are directed toward the gutter 107.

Figure 8:
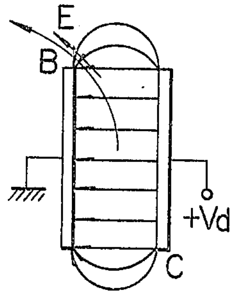
FIG. 8 PRIOR ART
FIG. 8 is a diagrammatic view of a prior art deflection plate arrangement used to explain adverse effects on the flight of ink drops.

In the case of the multi-nozzle ink-jet print head of the type described, it is preferable to minimize the distances between the adjacent nozzles 101 and between the adjacent deflection electrodes 105 so that the ink-jet print head 101 can be made compact in size and light in weight. However, when the spacing d between the adjacent deflection electrodes 105 is too narrow, the dielectric breakdowns occur at the portions indicated by A. In addition, the deflection range (the hatched area) of each of the streams of charged ink drops is extended fully in the space between the deflection plates 105. As a result, the most deflected ink drop is almost out of control at the leaving end of the negative deflection plate 105 (−), ultimately landing at an unpredicable position. More specifically, as shown in FIG. 8, in the case of the deflection plates 105 which are arranged in parallel with each other, the electrostatic lines are concentrated at the end B so that gradient E becomes high. As a result, under the influence of the concentrated electric field, the charged ink drop 103 is deflected to a considerable degree as indicated by the arrow. Same problem occurs at the entering end C.

Figure 9:
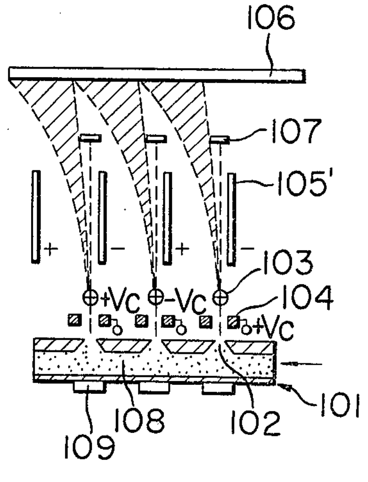
FIG. 9 PRIOR ART
FIG. 9 is a fragmentary sectional view of another prior art multi-nozzle ink-jet print head.

In order to overcome the problem of dielectric breakdown, the deflection electrodes or plates 105' are arranged in parallel with each other as shown in FIG. 9 and are alternatively charged positive and negative. With this arrangement, the streams of ink drops must be alternatively charged positive and negative. To this end, the charge electrodes 104 must be also alternatively charged positive and negative. As a result, the print head becomes very complex in construction.

It is of course preferable that the printed images have a higher degree of resolution. To this end, there has been proposed an ink-jet print head in which the nozzles have a very small diameter so that the diameter of the ink drops can be reduced to a minimum and each character or the like can be printed with a large number of ink dots. However, the result is that the ink drops, which are very small in diameter, can have only a lower degree of kinetic energy so that they are easily susceptible to even very small degrees of aerodynamic and electrostatic disturbances. Especially at the leaving end B of the deflection plate 105, the ink drops are deviated from the intended flight paths. As a result, the misplacement of ink drops results in misregistration, and merging and scattering occurs so that distortion of the printed character or the like results.

As will be described in detail below with particular reference to FIGS. 10 through 14, in order to overcome the above-described problems, the present invention provides deflection plates which are disposed in parallel with each other and whose entering and/or leaving ends are tapered so that the distortions of the electric field at the entering and leaving ends can be minimized and the dielectric breakdown between the adjacent deflection plates can be completely avoided. The present invention is adapted to be applied particularly to the multi-nozzle ink-jet print heads.

Figure 10:
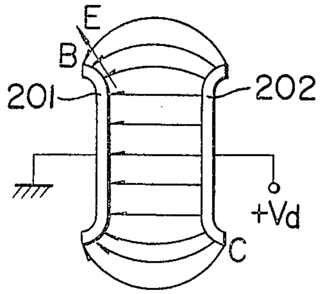
FIG. 10 shows the fundamental construction of deflection plates in accordance with the present invention.

In FIG. 10 is shown a fundamental construction of the deflection plates 201 and 202 in accordance with the present invention. Both the entering and leaving ends C and B of the deflection plates 201 and 202 are tapered outwardly so that the strength E of the electric field may be reduced at the ends C and B. Because of this special configurations of the deflection plates 201 and 202, the electrostatic lines adjacent to the ends C and B can be made substantially parallel with those between them so that the disturbances of the electric field at the ends C and B can be minimized to a considerable degree. As a result, the deviations of the ink drops from the intended flight paths can be avoided completely so that the range of deflections of charged ink drops can be fully extended between the deflection plates 201 and 202.

Figure 11:
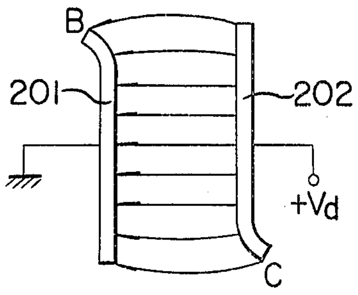
FIG. 11 shows another embodiment of deflection plates in accordance with the present invention.

Since the concentrations of the electrostatic lines which most adversely affect the flight paths of the charged ink drops occur at the entering end C of the deflection plate 202 and the leaving end B of the deflection plate 201, only these ends C and B can be tapered outwardly as shown in FIG. 11.

Figure 12:
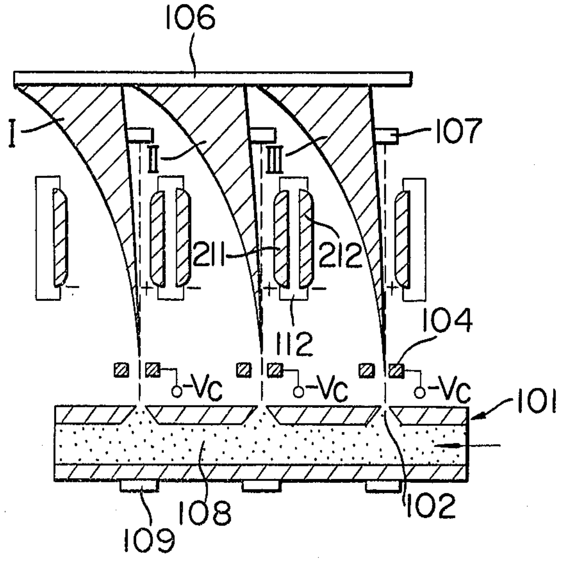
FIG. 12 is a fragmentary sectional view of a multi-nozzle ink-jet print head to which is applied the present invention, the print head using deflection plate units.
Figure 13:
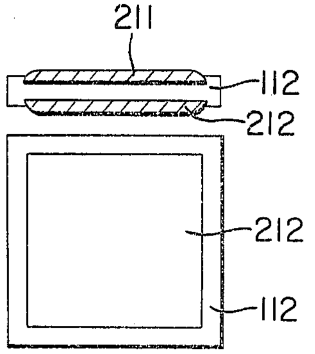
FIG. 13 is a top view and a side view of one deflection plate unit.

In FIG. 12 is shown a multi-nozzle ink-jet print head to which is applied the present invention. The positively charged deflection plate 211 of a pair of deflection plates II and the adjacent negatively charged deflection plate 212 of the adjacent deflection plate pair III are mounted on a single insulation plate 112. That is, the oppositely charged deflection plates of the adjacent deflection plate pairs are mounted on the same or common insulating plate so that they may be unitized as best shown in FIG. 13. The deflection plates 211 and 212 have a relatively great thickness and their entering and leaving ends are tapered or rounded with a suitable radius as shown in FIG. 13 so that the same effects as the deflection plate pairs as shown in FIGS. 10 and 11 can be also attained. In addition, the adjacent deflection plates 211 and 212 are mounted on the insulating plate 112 as a unitized construction so that the dielectric breakdown problem can be also solved. Furthermore, in the case of the assembly, the arrangement of the deflection plates can be substantially facilitated and moreover, they can be correctly positioned with a higher degree of accuracy.

Figure 14:
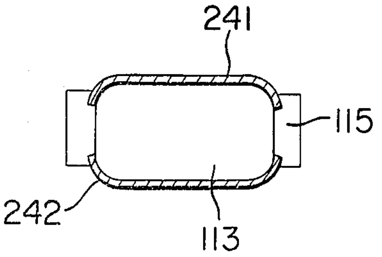
FIG. 14 is a top view and a front view of a variation of a deflection plate unit.

In FIG. 14 is shown another example of a deflection plate unit. An insulating plate or base 113 is made of a copolymer (such as Mylar or Teflon) of polyethyleneterephthalate and ethylene fluorides. The four corners of the insulating plate or base 113 are rounded and the deflection plates 241 and 242 in the shape as shown in FIG. 10 are formed on the major surfaces of the insulating plate or base 113 by a vacuum deposition process. The insulating and mounting plates 115 are attached to the insulating plate or base 113 so that the deflection plate unit can be mounted on a supporting frame or the like of the ink-jet print head.

In the deflection plates shown in FIGS. 10, 11 and 12, the end portions of the parallel deflection plates are tapered outwardly in such a way that the deflection plates are gradually and increasingly spaced apart from each other. In the case of the multi-nozzle ink-jet print head, the adjacent oppositely charged deflection plates of the adjacent deflection plate pairs are mounted on the same insulating plate or the like so that they may be unitized. At both the entering and leaving ends of the deflection plates, the gradients of the electric field can be reduced so that the adverse effects on the charged ink drops passing these ends can be minimized. In addition, the problem of dielectric breakdown caused when the spacing between the deflection plates is too narrow can be also overcome.

Figure 15:
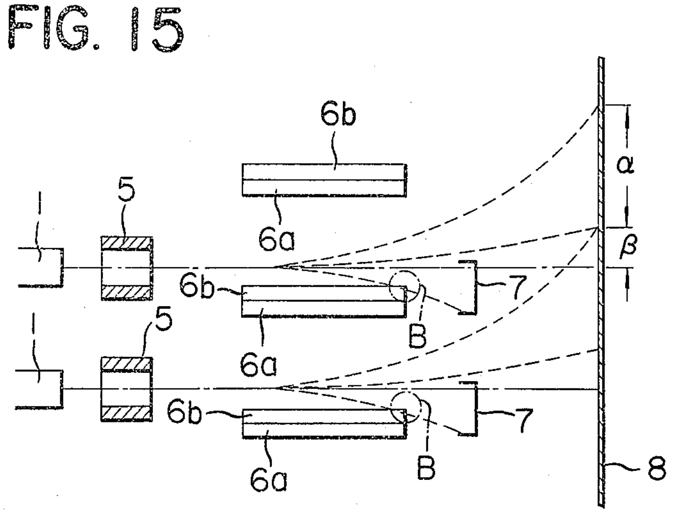
FIG. 15 is a fragmentary sectional view of a multi-nozzle ink-jet print head used to explain the problems caused by the impingement of uncharged ink drops against a deflection plate.

As described previously, in order to attain the images with a higher degree of resolution, a large number of nozzles are used and the diameter of these nozzles is reduced to a minimum. However, as described elsewhere, when the diameter of the ink drops is too small, their kinetic energy becomes too small as compared with the resistance of the air and the energies of the turbulent air flows. As a result, the flight of the ink drops is greatly disturbed. Referring back to FIG. 1, in order to solve this problem, there has been proposed a system in which the distance between the ink drop generator 1 and the recording sheet 8 is reduced to a minimum so that the flight time of the ink drops can be minimized. For instance, assuming that the diameter of the nozzle 2 is 30 micrometers, the exciting frequency of the piezoelectric crystal or the like 3 is 100 KHz; the issuing velocity of the ink jet is 20 m/sec; and the greatest deflection ($\alpha+\beta$, see FIG. 15) be 7 mm, the uncharged ink drop, which is slightly charged in the opposite polarity in practice by the leading ink drop which is charged, is deflected in the opposite direction by an amount of about one millimeter. As a result, in the case of a multi-nozzle ink-jet print head, the uncharged ink drop impinges against the deflection plate 6*b* at the region encircled by the one-dot-chain-line circle B in FIG. 15. Consequently, the deflection plate 6*b* is contaminated with the ink drops and therefore, the electric field adjacent to the leaving end of the deflection plate 6*b* is disturbed. In addition, when the uncharged ink drops impinge against the leaving end B, substantially smaller droplets called satellites are produced, contaminating the printed images.

Figure 16A:
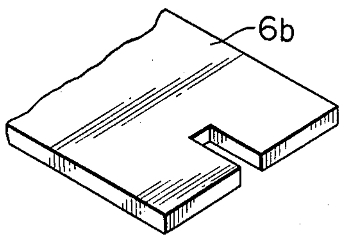
FIGS. 16A, 16B and 16C are perspective views of deflection plates in accordance with the present invention.
Figure 16B:
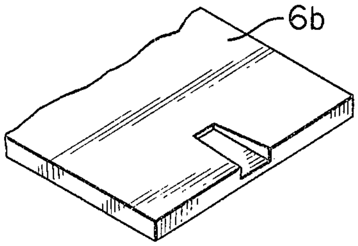
Figure 16C:
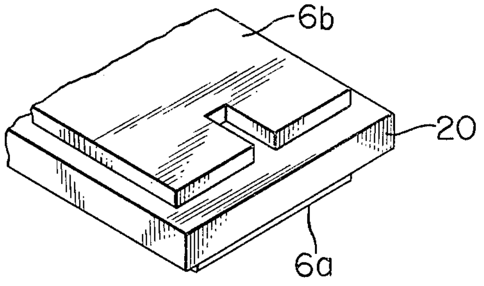

The present invention also provides deflection plates as shown in FIGS. 16A, 16B and 16C which can overcome such a problem as described just above. A deflection plate 306*b* shown in FIG. 16A is provided with a slot at the leaving end of the deflection plate 306*b* in parallel with the flight path A of the ink drops. Alternatively, as shown in FIG. 16B, a tapered axial groove is formed at the leaving end of the deflection plate 306*b*. With these arrangements, the disturbance of the electric field at the leaving end of the deflection plate 306*b* can be minimized. In the case of a multi-nozzle ink-jet print head, the deflection electrode or plate 306*b* as shown in FIG. 16A or 16B is mounted on an insulating mount 320 together with a deflection plate 306*a*. Alternatively, a slot or tapered groove is formed in the insulating mount 320 and the deflection plates 306*a* and 306*b* can be formed by vacuum deposition as described elsewhere with reference to FIG. 14.

Figure 17:
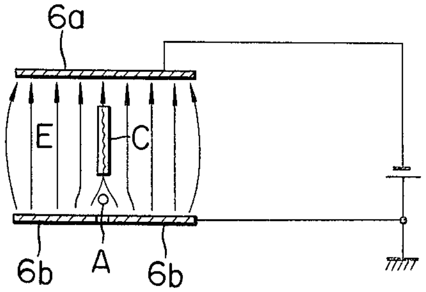
FIG. 17 shows the electric field established between the deflection plates in accordance with the present invention.

FIG. 17 shows the electrostatic lines when the deflection plate 306*b* is provided with a slot as described above. It is seen that no disturbance of the electric field (C) occurs at the leaving end as indicated by the locus of a deflected ink drop.

In summary, according to the present invention the impingement of uncharged ink drops against the deflection plate can be avoided completely so that the distance between the ink drop generator and the recording paper can be reduced to a minimum. As a result, the adverse effects due to the aerodynamic disturbances while the ink drops are in flight can be avoided so that a multi-nozzle ink-jet head with more nozzles which are very closely spaced apart from each other becomes feasible in practice.

What is claimed is:

1. Deflection plates for an electrostatic ink-jet printer characterized in that the leaving end of said deflection plate which is adjacent to the axis along which the ink drops issue is formed with a notch parallel with said ink drop issuing axis whereby the gradient in the electrostatic field is reduced.

2. Deflection plates for an electrostatic ink-jet printer as set forth in claim 1, wherein said notch is in the form of a slot.

3. Deflection plates for an electrostatic ink-jet printer as set forth in claim 1, wherein said notch is in the form of a tapered axial groove.

4. Deflection plates for an electrostatic ink-jet printer as set forth in Claim 1, 2 or 3, further characterized in that said deflection plates form individually deflectable deflection plate pairs for a multi-nozzle ink-jet print head, and one of the deflection plates of one deflection plate pair and the other of the deflection plates of the adjacent pair are mounted on a common insulating mount as a unitary construction.

5. Deflection plates for an ink-jet printer of the electrostatic type as set forth in claim 1 wherein the deflection plates form individually deflectable deflection plate pairs for a multi-nozzle ink-jet print head and do not function as ink drop collectors during normal operation characterized in that the spacing between the entering ends of each of the deflection plate pairs is made greater than the boundary layer or layers of the air streams resulting from the flight of the ink drops, said deflection plates are disposed in parallel with each other, and the entering and leaving end portions of said deflection plates are tapered outwardly in such a way that the distance between them is gradually increased toward their entering and leaving ends, and one of the deflection plates of one deflection plate pair and the other of the deflection plates of the adjacent pair are mounted on a common insulating mount as a unitary construction.

6. Deflection plates for an electrostatic ink-jet printer as set forth in claim 5, wherein said deflection plates are mounted flush in said insulating mount, said insulating mount, thereby smoothly joining to the surface thereof for establishing the deflection field.

7. Deflection plates for an electrostatic ink-jet printer as set forth in claim 1 wherein the deflection plates do not function as ink drop collectors during normal operation characterized in that the spacing between the entering ends of each of the deflection plate pairs is made greater than the boundary layer or layers of the air streams resulting from the flight of the ink drops, said deflection plates are disposed in parallel with each other, and the distance between the leaving or rear end of a deflection plate closer to the axis of the flight of the ink drop and said axis of the flight is changed smoothly.

8. Deflection plates for an electrostatic ink-jet printer as set forth in claim 7 further characterized in that an insulating plate is further provided which smoothly joins to the surface for establishing the deflection field and is adjacent to the entering end of a deflection plate.

* * * * *